United States Patent
Li et al.

(10) Patent No.: US 8,015,452 B2
(45) Date of Patent: Sep. 6, 2011

(54) FLEXIBLE BUS ARCHITECTURE FOR MONITORING AND CONTROL OF BATTERY PACK

(75) Inventors: Guoxing Li, Sunnyvale, CA (US); Xiaojun Zeng, Shanghai (CN); Anquan Xiao, Shanghai (CN); Xiaohua Hou, Shanghai (CN)

(73) Assignee: O2Micro International, Ltd., Georgetown (KY)

( * ) Notice: Subject to any disclaimer, the term of this patent is extended or adjusted under 35 U.S.C. 154(b) by 0 days.

(21) Appl. No.: 12/872,432

(22) Filed: Aug. 31, 2010

(65) Prior Publication Data

US 2011/0145629 A1 Jun. 16, 2011

(51) Int. Cl.
G06F 11/00 (2006.01)
(52) U.S. Cl. ............. 714/43; 714/22; 713/340; 320/116
(58) Field of Classification Search .................. 714/22, 714/43; 713/340; 320/116
See application file for complete search history.

(56) References Cited

U.S. PATENT DOCUMENTS

| | | | |
|---|---|---|---|
| 4,716,354 A | | 12/1987 | Hacker |
| 4,723,241 A | * | 2/1988 | Grobel et al. .................. 714/4 |
| 5,423,050 A | * | 6/1995 | Taylor et al. .................. 714/31 |
| 5,850,351 A | * | 12/1998 | Lotfy et al. .................. 700/286 |
| 6,031,354 A | | 2/2000 | Wiley et al. |
| 6,094,053 A | * | 7/2000 | Harvey .................. 324/434 |
| 6,172,479 B1 | * | 1/2001 | Barton .................. 320/121 |
| 6,281,684 B1 | * | 8/2001 | James .................. 324/434 |
| 6,611,774 B1 | | 8/2003 | Zaccaria |
| 7,023,845 B1 | | 4/2006 | Simons et al. |
| 7,466,104 B2 | * | 12/2008 | Wang et al. .................. 320/118 |
| 7,511,457 B2 | * | 3/2009 | Emori et al. .................. 320/118 |
| 7,615,966 B2 | * | 11/2009 | Houldsworth et al. ....... 320/132 |
| 2004/0164706 A1 | * | 8/2004 | Osborne .................. 320/116 |
| 2005/0275389 A1 | | 12/2005 | Cordoba |
| 2006/0072262 A1 | | 4/2006 | Paik et al. |
| 2006/0259280 A1 | | 11/2006 | Zaccaria |
| 2007/0182377 A1 | * | 8/2007 | Vandensande ................ 320/132 |
| 2010/0259221 A1 | * | 10/2010 | Tabatowski-Bush ......... 320/134 |

FOREIGN PATENT DOCUMENTS

WO 9527358 A1 10/1995

OTHER PUBLICATIONS

EP search report received in Europe Application No. 10150165.8 dated Oct. 18, 2010.

* cited by examiner

*Primary Examiner* — Philip Guyton
(74) *Attorney, Agent, or Firm* — Wang Law Firm, Inc.; Li K. Wang (57) ABSTRACT

The present invention provides a control system which is used for a stacked battery of a plurality of battery packs. Each battery pack has a plurality of battery cells coupled in series. The control system is capable of reconfiguring communication among the battery packs in the stacked battery, and comprises a plurality of processors, a plurality of controllers, and a monitoring unit. The processors are coupled to the battery packs. Two adjacent processors among the processors are able to communicate with each other though a first bus. The controllers are coupled to the battery packs. Two adjacent controllers among the controllers are able to communicate with each other through a second bus. The processors are capable of communicating with the controllers through a third bus. The monitoring unit is used for monitoring communications among the plurality of processors and communications among the plurality of controllers. The monitoring unit is capable of detecting communication problems on the first bus and/or the second bus. The monitoring unit further is capable of reconfiguring communication paths among the plurality of processors and communication path among the plurality of controllers.

19 Claims, 11 Drawing Sheets

FLEXIBLE BUS ARCHITECTURE FOR MONITORING AND CONTROL OF BATTERY PACK

BACKGROUND OF THE INVENTION

1. Field of the Invention

The present invention generally relates to a reconfigurable bus architecture, and more specifically, relates to a reconfigurable bus architecture for a battery application.

2. Description of the Related Art

In battery management, it is always needed to monitor the status of a battery, such as each cell voltage, pack voltage and each cell environment temperature, by Analog Front End (AFE) devices or analog to digital converter. The analog front end device is coupled to the battery. The digital data will be transferred to a microprocessor for various purposes, such as OCV (Open Circuit Voltage), cell impedance tracking, SOC (State of Charge), SOH (State of Health), cell balance, coulomb counting or protection purpose due to OV (Over Voltage)/UV (Under Voltage), OT (Over Temperature)/UT (Under Temperature), or OC(Over Current)/SC(Short Circuit).

With increasing the number of the cells of the stacked battery, the voltage of the stacked battery will become higher and higher. Further, the voltage capacity of an analog front end device is limited by the pin count of the AFE device or the physical process breakdown voltage of the AFE device. In this case, only one analog front end device is not enough to monitor the whole stacked battery. A plurality of analog front end devices are needed to monitor the status of the stacked battery. As consequence, the operation of these analog front end devices and their interaction with the stacked battery become more complex. These devices communicate with each other through several different buses and efficient management of these devices becomes an issue for efficiency of the stack battery.

Therefore, there is a need for a flexible bus architecture that can be used in a stacked battery that enables efficient management of the analog front end devices.

SUMMARY OF THE INVENTION

In one embodiment, the present invention provides a control system which is used for a stacked battery of a plurality of battery packs. Each battery pack has a plurality of battery cells coupled in series. The control system is capable of reconfiguring communication among the battery packs in the stacked battery, and comprises a plurality of processors, a plurality of controllers, and a monitoring unit. The processors are coupled to the battery packs. Two adjacent processors among the processors are able to communicate with each other though a first bus. The controllers are coupled to the battery packs. Two adjacent controllers among the controllers are able to communicate with each other through a second bus. The processors are capable of communicating with the controllers through a third bus. The monitoring unit is used for monitoring communications among the plurality of processors and communications among the plurality of controllers. The monitoring unit is capable of detecting communication problems on the first bus and/or the second bus. The monitoring unit further is capable of reconfiguring communication paths among the plurality of processors and communication path among the plurality of controllers The present system and methods are therefore advantageous as they enable identification of abnormal information access behaviors. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

Figure 1:
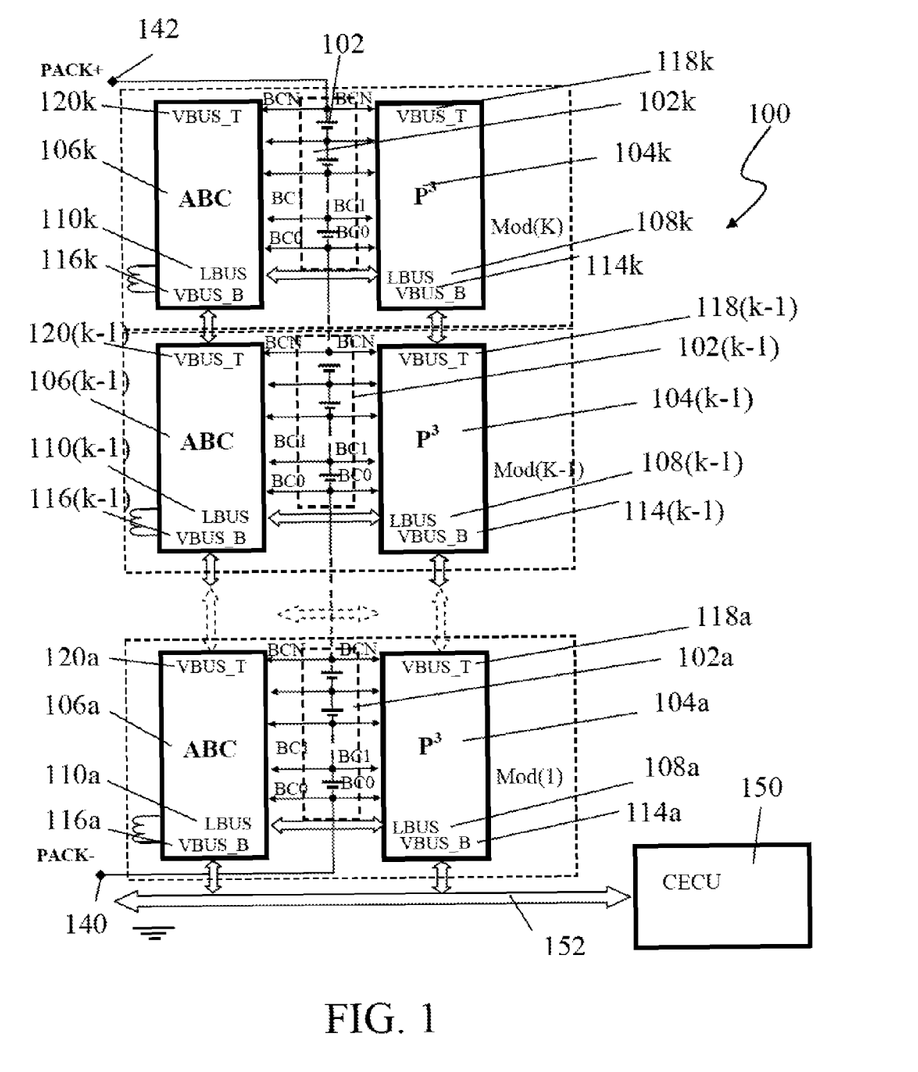
FIG. 1 depicts a control system according to one embodiment of the present invention.

FIG. 1 illustrates a flexible bus architecture for a control system 100 for a stacked battery 102 according to one embodiment of the present invention. The stacked battery 102 comprises a plurality of battery modules or packs 102a, ... 102(k−1), and 102k, which are stacked in series so as to provide electric power with high voltage to an electric device, such as an inverter/electric motor in an electric vehicle (EV) or a hybrid electric vehicle (HEV). The battery cell in the battery packs can be Lithium-Ion battery, NiMH battery, Lead Acid battery, Fuel Cell or Super Capacitor, etc.

A plurality of processors ($P^3$) 104a, ... 104(k−1), and 104k are coupled to the plurality of battery packs 102a, ... 102(k−1), and 102k, respectively. Each of the processors 104a, ... 104(k−1), and 104k comprises analog-to-digital converters (ADCs), not shown, which are coupled to each of the battery cells in the battery packs 102a, ... 102(k−1), and 102k. The processors 104a, ... 104(k−1), and 104k can monitor the voltage and temperature of each of the battery cells in the battery packs 102a, ... 102(k−1), and 102k through the ADCs.

A plurality of active balancing controllers (ABC) 106a, ... 106(k−1), and 106k are coupled to the plurality of battery packs 102a, ... 102(k−1), and 102k, respectively. During operation, particularly during discharging, the active balancing controller 106a, ... 106(k−1), and 106k can use an inductor to transfer the energy from one or more cells to the weakest one. Each of the active balancing controllers 106a, ... 106(k−1), and 106k further comprises a respective lateral bus (LBus) 110a, ... 110(k−1), or 110k. Each of the processors 104a, ... 104(k−1), and 104k comprises a respective lateral bus (LBus) 108a, ... 108(k–1), or 108k. The lateral buses 110a, ... 110(k–1), and 110k of the active balancing controllers 106a, ... 106(k–1), and 106k are respectively coupled to the lateral buses 108a, ... 108(k–1), and 108k of the processors 104a, ... 104(k–1), and 104k so as to communicate with each other. The lateral buses 110a, ... 110(k–1), and 110k of the active balancing controllers 106a, ... 106(k–1), and 106k and the lateral buses 108a, ... 108(k–1), and 108k of the processors 104a, ... 104(k–1), and 104k can be COMS logic circuit and be formed as an open-drain topology so as to drive the IO logic low and IO logic high by the pull-up resistor, not shown.

Each of the processors 104a, ... 104(k–1), and 104k comprises a respective vertical bottom bus (VBus_B) 114a, ... 114(k–1), or 114k and a respective vertical top bus (VBus_T) 118a, ... 118(k–1), or 118k. For the adjacent two processors, the vertical top bus of the lower processor is coupled to the vertical bottom bus of the upper processor so as to communicate with each other. Taking the processor 104(k–1) and the processor 104k as an example, the vertical top bus 118(k–1) of the processor 104(k–1), i.e., the lower processor, is coupled to the vertical bottom bus 114k of the processor 104k, i.e., the upper processor.

Each of the active balancing controllers 106a, ... 106(k–1), and 106k comprises a respective vertical bottom bus (VBus_B) 116a, ... 116(k–1), or 116k and a respective vertical top bus (VBus_T) 120a, ... 120(k–1), or 120k. For the adjacent two active balancing controllers, the vertical top bus of the lower active balancing controller is coupled to the vertical bottom bus of the upper active balancing controller so as to communicate with each other. Taking the active balancing controller 106(k–1) and the active balancing controller 106k as an example, the vertical top bus 120(k–1) of the active balancing controller 106(k–1), i.e., the lower processor, is coupled to the vertical bottom bus 116k of the active balancing controller 106k, i.e., the upper processor.

The control system 100 further comprises a central electronic control unit (CECU) 150. The central electronic control unit 150 communicates with the vertical bottom bus 114a of the lowest processor 104a in the control system 100 and the vertical bottom bus 116a of the lowest active balancing controller 106a in the control system 100 through a common bus 152.

In this architecture, during operation, the central electronic control unit 150 can access anyone of the active balancing controllers 106a, ... 106(k–1), and 106k through the vertical buses. When the central electronic control unit 150 need to access a specific active balancing controllers, e.g. the active balancing controllers 106(k–1), the central electronic control unit 150 will send the command signals to the lowest active balancing controllers 106a through the common bus 152 and the vertical bottom bus 116a. The command signals will be bypassed to the vertical top bus 120a through the internal level shifters and control logic, not shown, of the active balancing controllers 106a. And then, the command signals are transmitted to the upper vertical bottom bus of the upper active balancing controller. By similar transmission approach, the central electronic control unit 150 is able to access all the active balancing controllers 106a, ... 106(k–1), and 106k. There are two modes to respond to the command signals from the central electronic control unit 150, when the active balancing controllers 106a, ... 106(k–1), and 106k receive the command signals. In one mode, the central electronic control unit 150 can ask all of the active balancing controllers 106a, ... 106(k–1), and 106k to respond to the commend signal. In the other mode, the central electronic control unit 150 will provide a specific address in the command signal so as to specify one active balancing controller to respond to the command signal.

Similarly, the central electronic control unit 150 can also access all the processor 104a, ... 104(k–1) and 104k through the vertical buses. The monitoring voltages or temperatures of the processor 104a, ... 104(k–1) and 104k can also be transmitted to the central electronic control unit 150 by the similar approach or path.

The lateral buses 110a, ... 110(k–1), and 110k of the active balancing controllers 106a, ... 106(k–1), and 106k and the lateral buses 108a, ... 108(k–1), and 108k of the processors 104a, ... 104(k–1), and 104k normally are in idle state, which means in data receiving state (slave state). Any one of the lateral buses 110a, ... 110(k–1), and 110k of the active balancing controllers 106a, ... 106(k–1), and 106k and the lateral buses 108a, ... 108(k–1), and 108k of the processors 104a, ... 104(k–1), and 104k can be configured as master state when receiving a command from the central electronic control unit 150 such that the one of the lateral buses 110a, ... 110(k–1), and 110k of the active balancing controllers 106a, ... 106(k–1), and 106k and the lateral buses 108a, ... 108(k–1), and 108k of the processors 104a, ... 104(k–1), and 104k can send command or data to the corresponding slave device via the lateral bus. For example, when the central electronic control unit 150 sends a command to the processor 104a for actuating or instructing the processor 104a to send data to the active balancing controller 106a via the lateral bus 108a and the lateral bus 110a, the processor 104a will configure the lateral bus 108a to be in master state and then start the data transmission to the active balancing controller 106a at once. Alternatively, the active balancing controller 106a will configure the lateral bus 110a to be in master state and then start the data transmission to the processor 104a.

Alternatively, if the processor 104a, ... 104(k–1) or 104k or the active balancing controllers 106a, ... 106(k–1), or 106k detects any error conditions, the corresponding lateral buses 110a, ... 110(k–1), or 110k or the corresponding lateral buses 108a, ... 108(k–1), or 108k can be actuated. The error conditions include, but are not limited to, watch-dog time out, less bus line actuated than normal, wrong internal level-shifting feedback, and bus data integrity check error. For example, the condition of less bus line actuated than normal can include that, if the bus lines comprises a clock line and a data line, only one line is toggling and the other is always locked to one level. Further, as mentioned above, the signals received by the vertical bottom bus will be mapped to the vertical top bus through the internal level shifters and control logic. If the level-shifting is not working properly, the condition will actuate the corresponding lateral bus. In addition, the bus data integrity check error, for example, can be Packet Error Check (PEC) error or Error Checking and Correcting (ECC) error.

According to another embodiments of the present invention, the control system 100 can access all of the processor 104a, ... 104(k–1) and 104k and the active balancing controllers 106a, ... 106(k–1), and 106k through the vertical top and bottom buses. When any one of the vertical buses is in error, the corresponding lateral buses will be actuated and the control system 100 can access any one of the processor 104a, ... 104(k–1) and 104k and the active balancing controllers 106a, ... 106(k–1), and 106k through the vertical top and bottom buses and the lateral buses. For example, if the vertical top bus 118(k–1) of the processor 104(k–1) is in error, the central electronic control unit 150 can not access the processor 104k through the vertical top bus 118(k–1) of the processor 104(k–1) and the vertical bottom bus 114k of the processor 104k. The lateral bus 110k of the active balancing controller 106k, and the lateral bus 108k of the processor 104k will be actuated. In this case, the central electronic control unit 150 can access the processor 104k through the lateral bus 110k of the active balancing controller 106k, and the lateral bus 108k of the processor 104k. In other words, the central electronic control unit 150 and the processor 104k can communicate with each other through the active balancing controller 106k in sequence. Under this architecture, the control system 100 according to the embodiment of the present invention is formed as an H-type bus and provides redundancy communication As mentioned above, the control system 100 according to the embodiment of the present invention provides great redundancy. In the bus path, even there are multiple breakpoints, the communication is still working properly.

Figure 2:
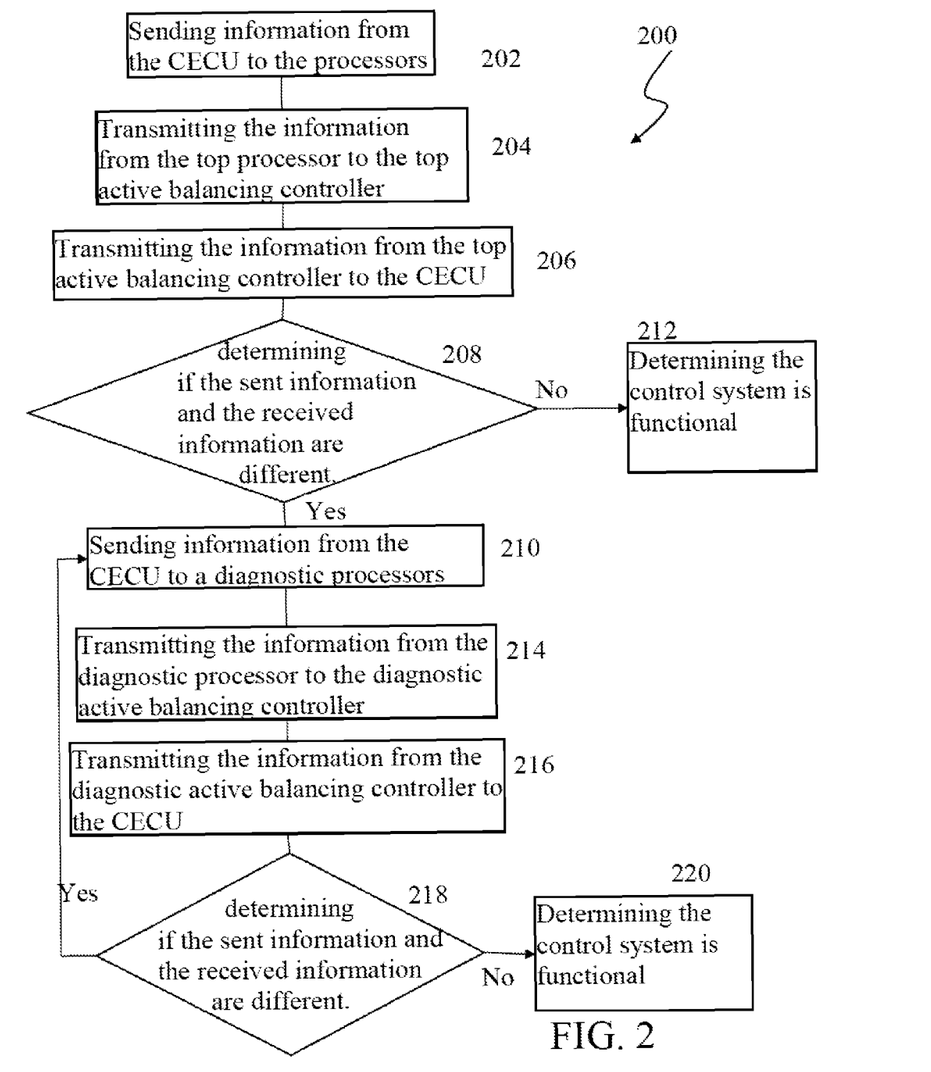
FIG. 2 depicts a method for self-diagnostic through loopback according to one embodiment of the present invention.

Under this architecture, the control system 100 also provides a self-diagnostic function to detect the failure of the vertical or lateral buses. Referring to FIG. 2, it illustrates a method 200 for self-diagnostic through loop-back according to one embodiment of the present invention. In 202 of the self-diagnostic method 200, an information is sent from the central electronic control unit 150 through every the processors 104a, . . . and 104(k−1) to the top processor 104k. In 204, the information is transmitted from the top processor 104k to the top active balancing controller 106k through the top lateral buses 108k and 110k. In 206, the information can be looped back from the top active balancing controller 106k to the top processor 104k through the top lateral buses 108k and 110k, then to the central electronic control unit 150 through every the processors 104(k−1), and 104a, i.e., from the processor 104(k−1) to the bottom processor 104a. In 208, the information sent from the central electronic control unit 150 and the information received by the central electronic control unit 150 are compared. If the received information is different from the sent information, go to 210, and if not, go to 212. In the 212, it is determined that the control system 100 is working properly. In the 210, the information is sent from the central electronic control unit 150 to the diagnostic processor which is one level lower than the previous processor through the processors. In 214, the information is transmitted from the diagnostic processor in the 210 to the diagnostic active balancing controller, which is at the same level with the diagnostic processor, through the corresponding lateral buses. In 216, the information is transmitted from the diagnostic active balancing controller to the central electronic control unit 150 through the active balancing controllers. In 218, the information sent from the central electronic control unit 150 and the information received by the central electronic control unit 150 are compared. If the received information is different from the sent information, go to the 210 again, and if not, go to 220. In the 220, it is determined that the communication buses, the processors and the active balancing controllers lower than the diagnostic processor and the diagnostic active balancing controller are in working condition.

According to other embodiment of the present invention, processes or steps similar to those disclosed in the self-diagnostic method 200 can be executed to eliminate any one of the processors 104a, . . . 104(k−1) and 104k and active balancing controllers 106a, . . . 106(k−1), and 106k so as to determine whether any bus of any processor or active balancing controller is in working condition.

Furthermore, the architecture of the control system 100 also provides a great flexibility to expand. If any circuit or IC, such as a secondary protection circuit, comprises the similar lateral bus and complies with the same lateral bus protocol, and it can be coupled to the process and communicate with the central electronic control unit 150.

Figure 3:
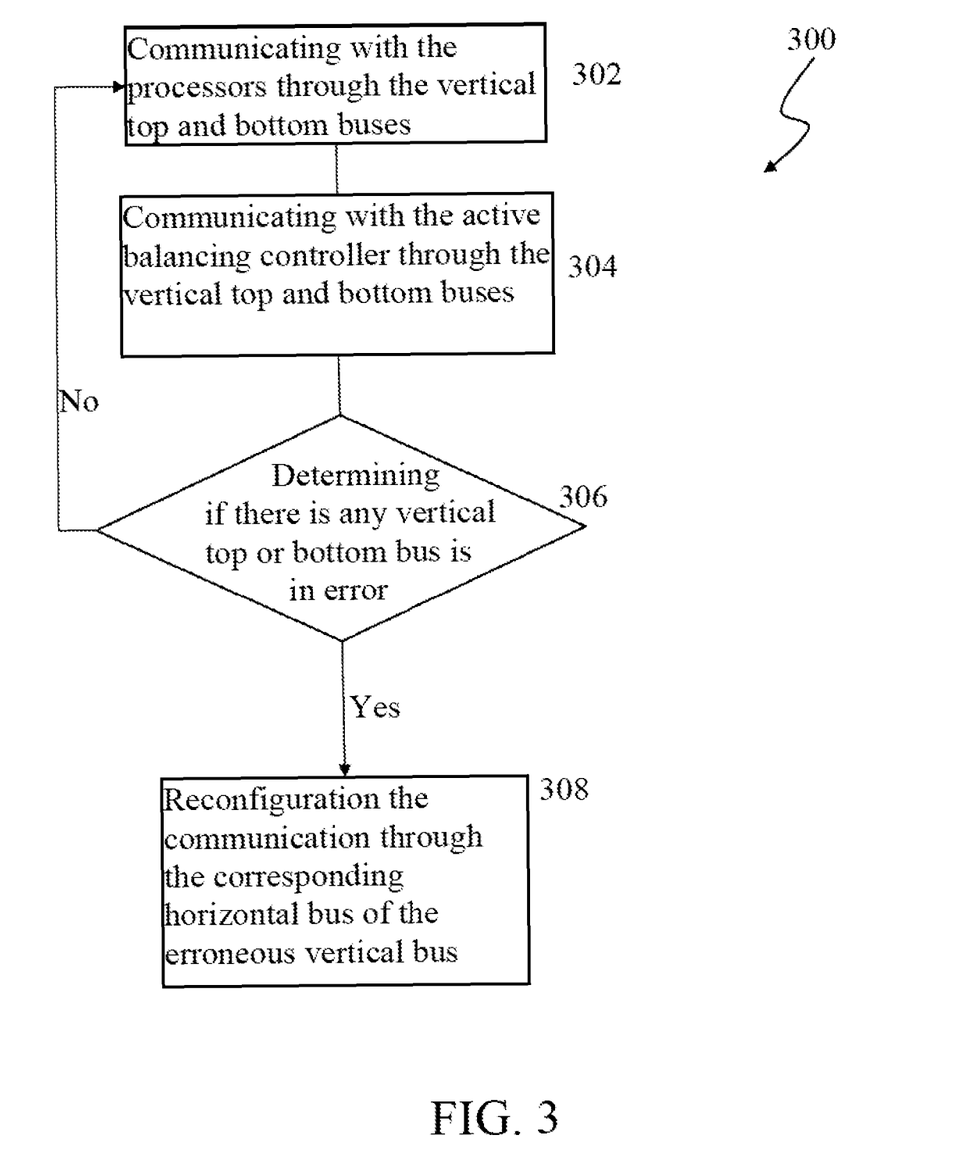
FIG. 3 depicts a method for reconfiguring a control system according to another embodiment of the present invention.

Under this architecture, the control system 100 also provides a reconfiguring function to communicate with the processors 104a, . . . 104(k−1) and 104k and the active balancing controllers 106a, . . . 106(k−1), and 106k. Referring to FIG. 3, it illustrates a method 300 for reconfiguring the control system 100 according to an embodiment of the present invention. In 302, the central electronic control unit 150 of the control system 100 is communicating with the processors 104a, . . . 104(k−1) and 104k through the vertical top buses 118a, . . . 118(k−2) and/or 118(k−1) and the vertical bottom buses 114a, . . . 114(k−1) and/or 114k thereof. In 304, the central electronic control unit 150 is communicating with the active balancing controllers 106a, . . . 106(k−1), and 106k through the vertical top buses 120a, . . . 120(k−2) and/or 120(k−1) and the vertical bottom buses 116a, . . . 116(k−1) and/or 116k thereof. In 306, the central electronic control unit 150 detects and determines if there is any vertical top or bottom bus is in error. A possible way for the central electronic control unit 150 to detect a problem in the communication to an active balancing controller or a processor is when the central electronic control unit 150 is not receiving battery information, such as voltage, and temperature, from a particular processor. Another possible way for the central electronic control unit 150 to detect a communication problem with an active balancing controller is when a particular battery pack is not adjusting its load despite of instructions sent by the central electronic control unit 150.

If there is no problem, the control system 100 goes back to 302, and if yes, goes to 308. In the 308, the control system 100 actuates the two corresponding lateral buses of the error vertical bus so as to reconfigure the communication. If the vertical top bus is in error, the lateral bus at the same level with the erroneous vertical top bus and the lateral bus at one level higher than the erroneous vertical top bus are actuated. If the vertical bottom bus is in error, the lateral bus at the same level with the erroneous vertical bottom bus and the lateral bus at one level lower than the erroneous vertical bottom bus are actuated.

Figure 4:
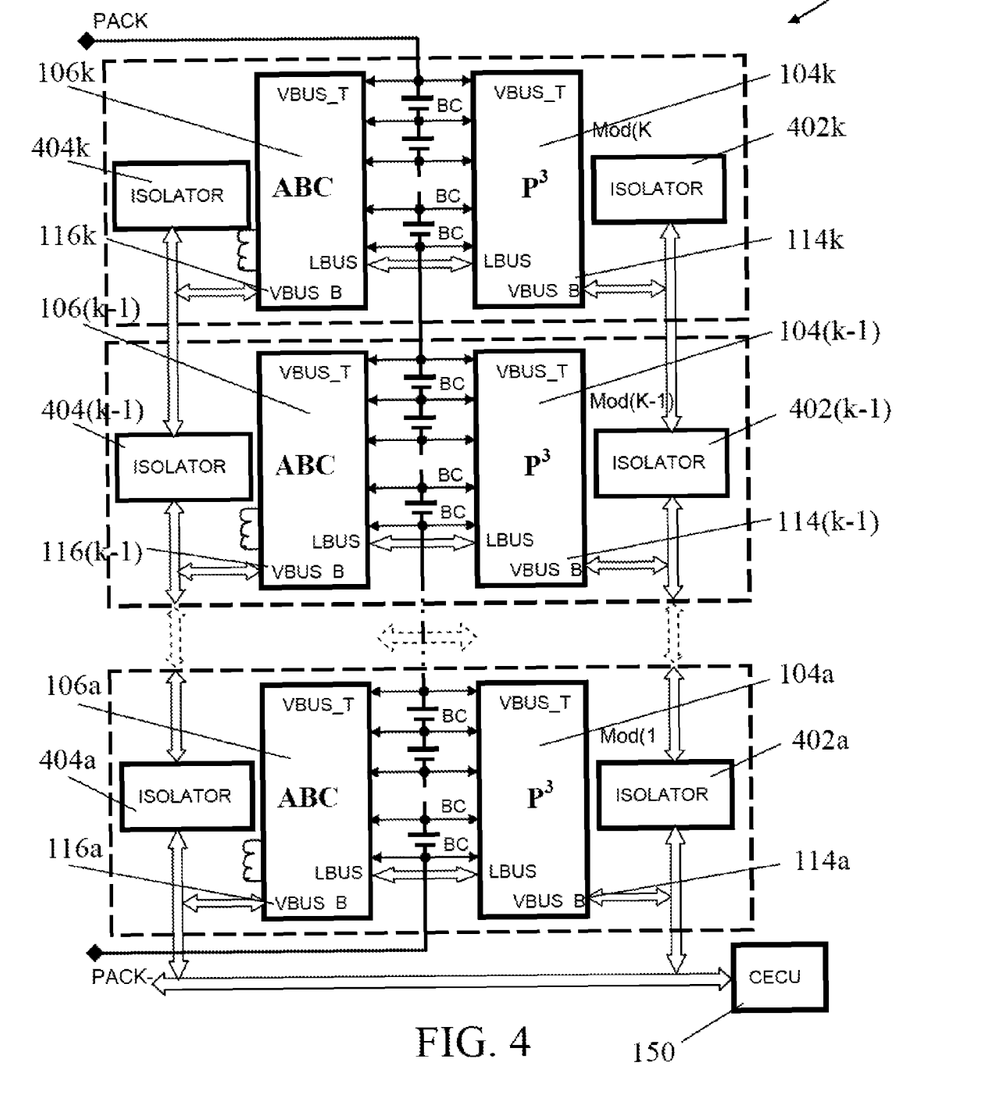
FIG. 4 depicts a control system with two sets of isolators according to another embodiment of the present invention.

Referring to FIG. 4, it illustrates a control system 400 according to one embodiment of the present invention. The control system 400 shown in FIG. 4 is similar to the control system 100 shown in FIG. 1, and similar elements are indicated with same reference numerals. The control system 400 comprises a first set of plurality of isolators 402a, . . . 402(k−1) and 402k and a second set of plurality of isolators 404a, . . . 404(k−1) and 404k. The first set of isolators 402a, . . . 402(k−1) and 402k are coupled to each other in series or in the cascade connection, and comprises level shifters and voltage isolators, not shown. The vertical bottom bus 114a, . . . 114(k−1) and 114k of the processors 104a, . . . 104(k−1), and 104k are coupled to the first set of isolator 402a, . . . 402(k−1) and 402k. As shown in FIG. 4, the central electronic control unit 150 can access all the processors 104a, . . . 104(k−1), and 104k through the isolators 402a, . . . 402(k−1) and 402k and the vertical bottom bus 114a, . . . 114(k−1) and 114k of the processors 104a, . . . 104(k−1), and 104k. Similarly, the second set of isolator 404a, . . . 404(k−1) and 404k are coupled to each other in series and comprises level shifters and voltage isolators, not shown. The vertical bottom bus 116a, . . . 116(k−1) and 116k of the active balancing controllers 106a, . . . 106(k−1), and 106k are coupled to the second set of isolator 404a, . . . 404(k−1) and 404k. As shown in FIG. 4, the central electronic control unit 150 can access all the active balancing controllers 106a, . . . 106(k−1), and 106k through the isolators 404a, . . . 404(k−1) and 404k and the vertical bottom bus 116a, . . . 116(k−1) and 116k of the active balancing controllers 106a, . . . 106(k−1), and 106k.

The control system 400 according to one embodiment of the present invention is also formed as an H-type bus and provides redundancy communication.

Figure 5:
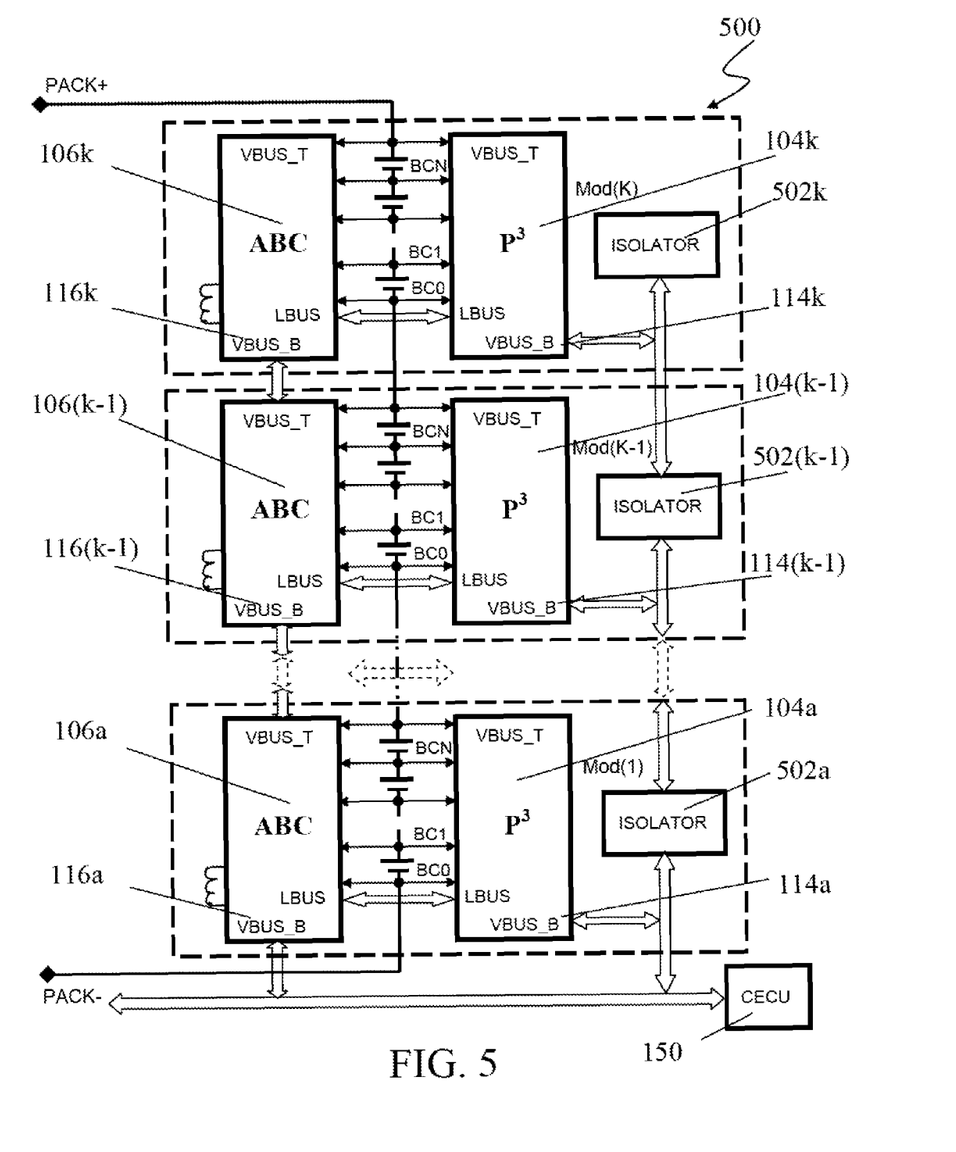
FIG. 5 depicts a control system with one set of isolators according to another embodiment of the present invention.
Figure 6:
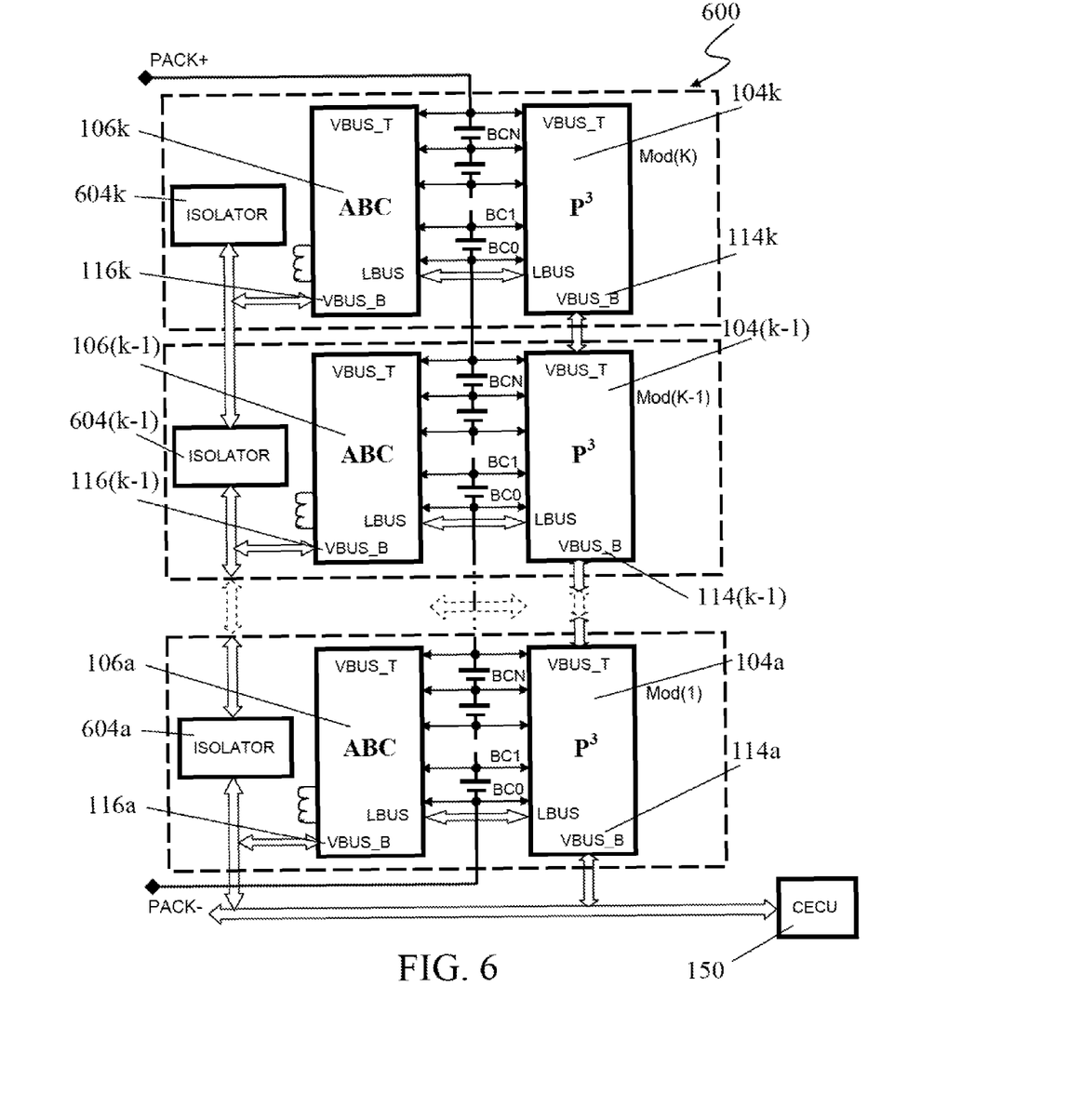
FIG. 6 depicts a control system with one set of isolators according to another embodiment of the present invention.

Referring to FIG. 5 and FIG. 6, they illustrate a control system 500 and a control system 600 according to embodiments of the present invention. The control system 500 and the control system 600 shown in FIG. 5 and FIG. 6 are similar to the control system 400 shown in FIG. 4, and similar elements are indicated with same reference numerals. The control system 500 in the FIG. 5 only comprises a set of plurality of isolators 502a, . . . 502(k−1) and 502k which are coupled to the vertical bottom bus 114a, . . . 114(k−1) and 114k of the processors 104a, . . . 104(k−1), and 104k. As shown in FIG. 5, the central electronic control unit 150 can access all the processors 104a, . . . 104(k−1), and 104k through the isolators 502a, . . . 502(k−1) and 502k and the vertical bottom bus 114a, . . . 114(k−1) and 114k of the processors 104a, . . . 104(k−1), and 104k. The control system 600 in the FIG. 6 only comprises a set of plurality of isolators 604a, . . . 604(k−1) and 604k which are coupled to the vertical bottom bus 116a, . . . 116(k−1) and 116k of the active balancing controllers 106a, . . . 106(k−1), and 106k. As shown in FIG. 6, the central electronic control unit 150 can access all the active balancing controllers 106a, . . . 106(k−1), and 106k through the isolators 604a, . . . 604(k−1) and 604k and the vertical bottom bus 116a, . . . 116(k−1) and 116k of the active balancing controllers 106a, . . . 106(k−1), and 106k. The control system 500 and the control system 600 according to the embodiments of the present invention are also formed as an H-type bus and provide redundancy communication.

Figure 7:
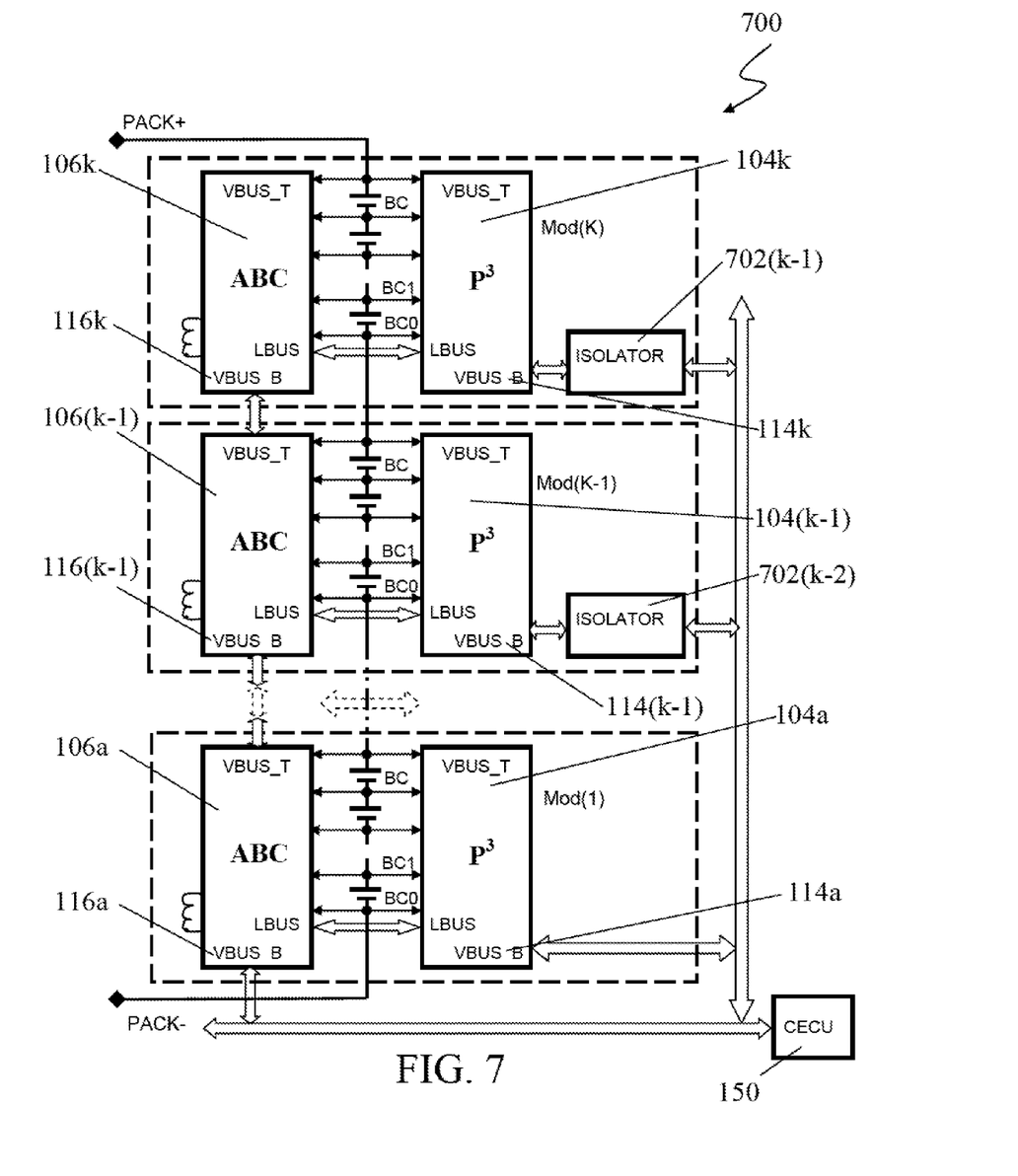
FIG. 7 depicts a control system with isolators in the star connection according to another embodiment of the present invention.

Referring to FIG. 7, it illustrates a control system 700 according to another embodiment of the present invention. The control system 700 shown in FIG. 7 is similar to the control system 100 shown in FIG. 1, and similar elements are indicated with same reference numerals. The control system 700 in the FIG. 7 comprises a set of a plurality of isolators 702a, . . . 702(k−2) and 702(k−1) which are coupled to the vertical bottom bus 114b, . . . 114(k−1) and 114k of the processors 104b, . . . 104(k−1), and 104k. The plurality of isolators 702a, . . . 702(k−2) and 702(k−1) and the central electronic control unit 150 are coupled to each other in a star connection, which means each of the processors 104a, . . . 104(k−1), and 104k is directly connected to the central electronic control unit 150 through a bus. The isolators 702a, . . . 702(k−1) and 702(k−1) are needed because of voltage difference in the signals from the vertical bottom buses 114b, . . . 114(k−1) and 114k of the processor 104a, . . . 104(k−1), and 104k. As shown in FIG. 7, the central electronic control unit 150 can access all the processors 104a, . . . 104(k−1), and 104k through the isolators 702a, . . . 702(k−2) and 702(k−1) and the vertical bottom bus 114a, . . . 114(k−1) and 114k of the processors 104a, . . . 104(k−1), and 104k. The communication between the central electronic control unit 150 and active balancing controllers 106a, . . . 106(k−1), and 106k are through the vertical bottom bus (VBus_B) 116a, . . . 116(k−1), and 116k and the vertical top bus (VBus_T) 120a, . . . 120(k−1), or 120k of the active balancing controllers 106a, . . . 106(k−1), and 106k. If the communication between one active balancing controller 106(i) and an adjacent active balancing controller 106(i+1) is broken, the information can be re-routed from the active balancing controller 106(i) to the corresponding processor 104(i) and back to the next processor 104(i+1) and then to the active balancing controller 106(i+1). The control system 700 according to the embodiment of the present invention is also formed as an H-type bus and provides redundancy communication.

Figure 8:
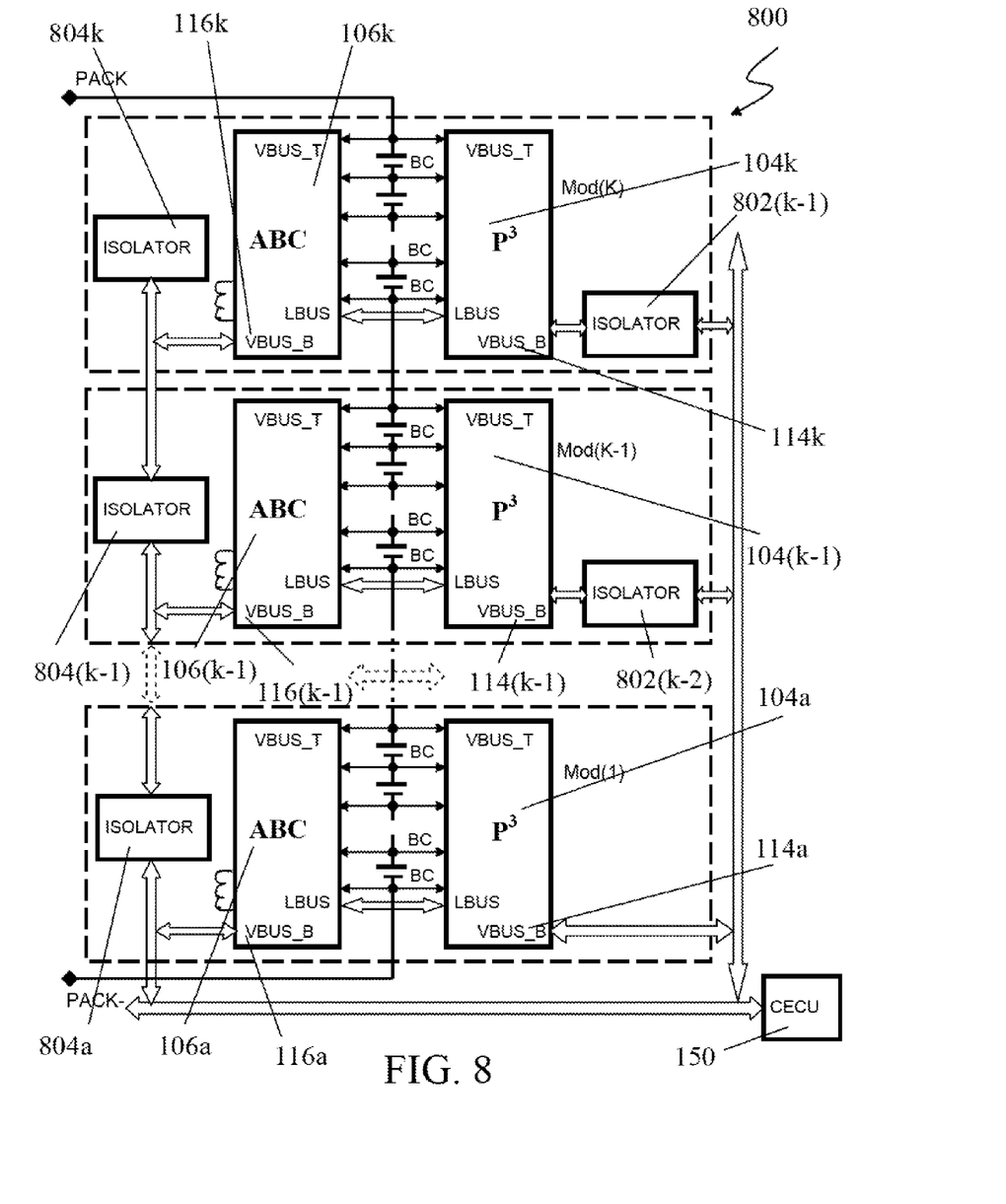
FIG. 8 depicts a control system with two set of isolators according to another embodiment of the present invention.

Referring to FIG. 8, it illustrates a control system 800 according to another embodiment of the present invention. The control system 800 shown in FIG. 8 is similar to the control system 700 shown in FIG. 7, and similar elements are indicated with same reference numerals. The control system 800 in the FIG. 8 comprises a first set of a plurality of isolators 802a, . . . 802(k−2) and 802(k−1) which are coupled to the vertical bottom bus 114b, . . . 114(k−1) and 114k of the processors 104b, . . . 104(k−1), and 104k, and a second set of a plurality of isolators 804a, . . . 804(k−1) and 804k which are coupled to the vertical bottom bus 116a, . . . 116(k−1) and 116k of the active balancing controllers 106a, . . . 106(k−1), and 106k. The first set of isolators 802a, . . . 802(k−2) and 802(k−1) are coupled to each other in the star connection. The second set of isolators 804a, . . . 804(k−1) and 804k are coupled to each other in the cascade connection. As shown in FIG. 8, the central electronic control unit 150 can access all the processors 104a, . . . 104(k−1), and 104k through the isolators 802a, . . . 802(k−2) and 802(k−1) and the vertical bottom bus 114a, . . . 114(k−1) and 114k of the processors 104a, . . . 104(k−1), and 104k. Similarly, the communication between the central electronic control unit 150 and active balancing controllers 106a, . . . 106(k−1), and 106k are through the second set of isolators 804a, . . . 804(k−1) and 804k and the vertical bottom bus (VBus_B) 116a, . . . 116(k−1), and 116k of the active balancing controllers 106a, . . . 106(k−1), and 106k. If the communication between one active balancing controller 106(i) and an adjacent active balancing controller 106(i+1) or between one isolator 804(i) and an adjacent isolator 804(i+1) and is broken, the information can be re-routed from the isolator 804(i) via the active balancing controller 106(i) to the corresponding processor 104(i) and back to the next processor 104(i+1) and then to the active balancing controller 106(i+1). The control system 800 according to the embodiment of the present invention is also formed as an H-type bus and provides redundancy communication.

Figure 9:
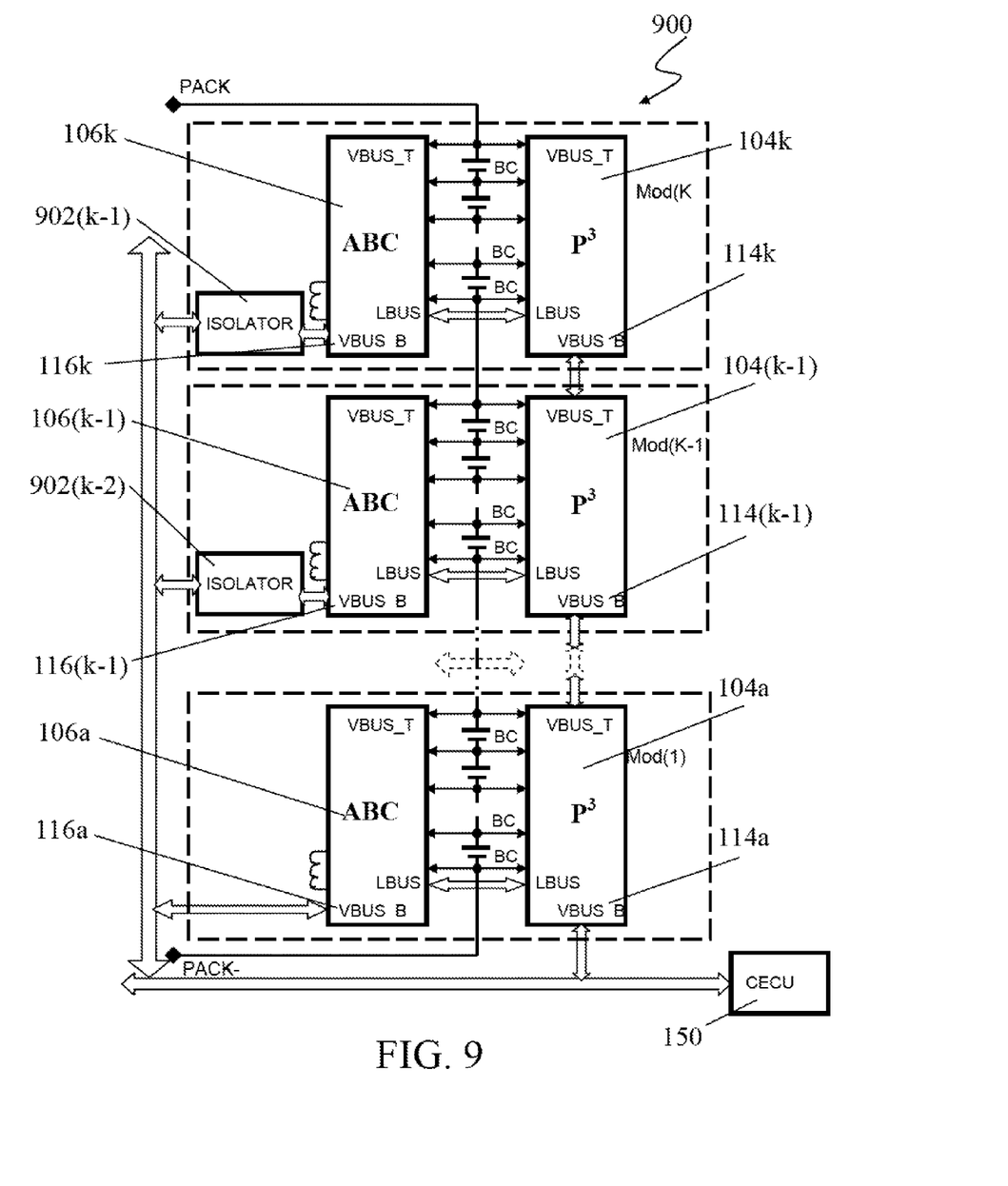
FIG. 9 depicts a control system with isolators in the star connection according to another embodiment of the present invention.

Referring to FIG. 9, it illustrates a control system 900 according to another embodiment of the present invention. The control system 900 shown in FIG. 9 is similar to the control system 700 shown in FIG. 7, and similar elements are indicated with same reference numerals. The control system 900 in the FIG. 9 comprises a set of a plurality of isolators 902a, . . . 902(k−2) and 902(k−1) which are coupled to the vertical bottom bus 116b, . . . 116(k−1) and 116k of the active balancing controllers 106b, . . . 106(k−1), and 106k. The plurality of isolators 902a, . . . 902(k−2) and 902(k−1) and the central electronic control unit 150 are coupled to each other in a star connection. As shown in FIG. 9, the central electronic control unit 150 can access all the active balancing controllers 106a, . . . 106(k−1), and 106k through the isolators 902a, . . . 902(k−2) and 902(k−1) and the vertical bottom bus 116a, . . . 116(k−1) and 116k of the active balancing controllers 106a, . . . 106(k−1), and 106k. The control system 900 according to the embodiment of the present invention is also formed as an H-type bus and provides redundancy communication.

Figure 10:
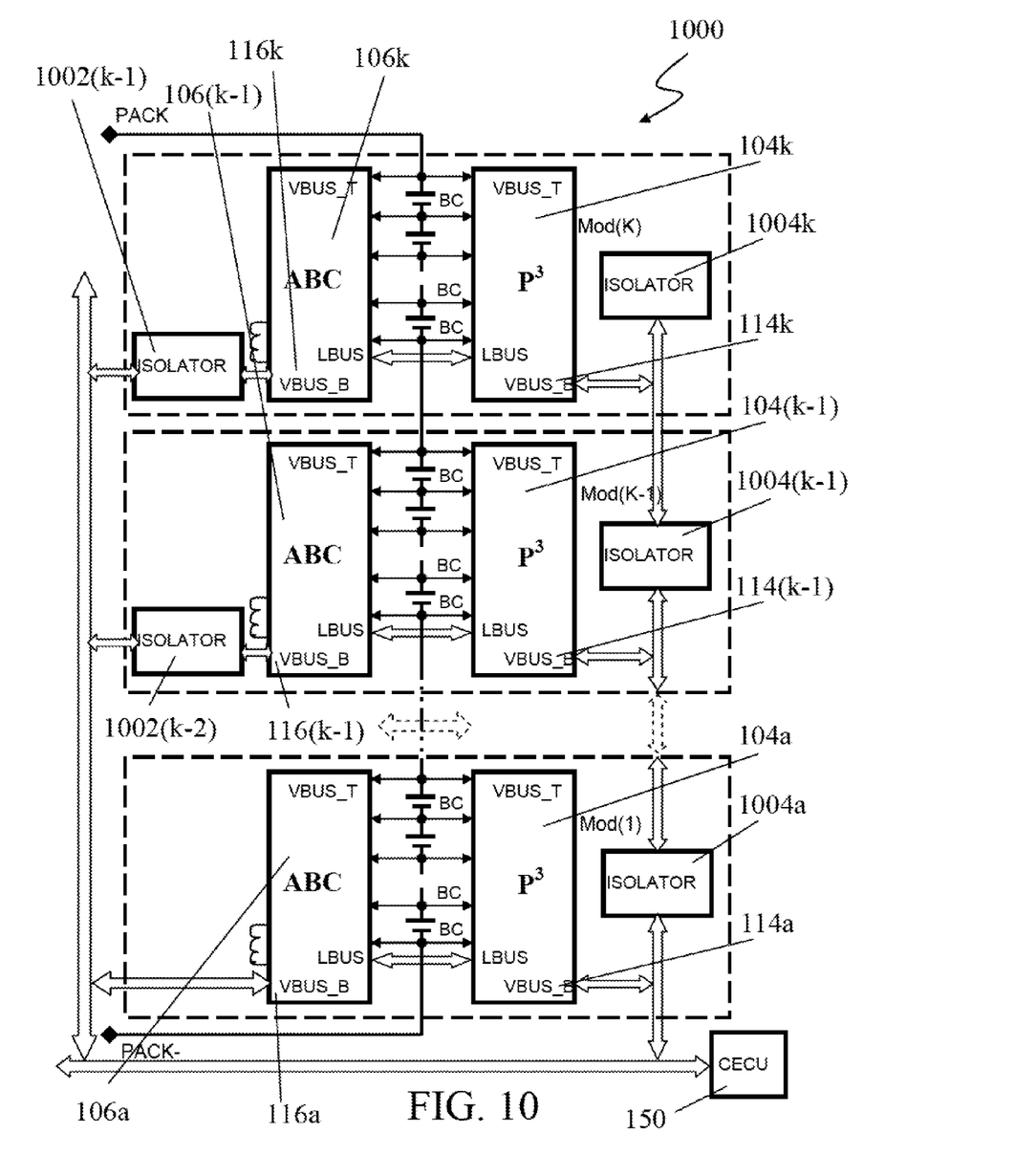
FIG. 10 depicts a control system with two set of isolators according to another embodiment of the present invention.

Referring to FIG. 10, it illustrates a control system 1000 according to another embodiment of the present invention. The control system 1000 shown in FIG. 10 is similar to the control system 800 shown in FIG. 8, and similar elements are indicated with same reference numerals. The control system 1000 in the FIG. 10 comprises a first set of a plurality of isolators 1002a, . . . 1002(k−2) and 1002(k−1) which are coupled to the vertical bottom bus 116b, . . . 116(k−1) and 116k of the active balancing controllers 106b, . . . 106(k−1), and 106k, and a second set of plurality of isolator 1004a, . . . 1004(k−1) and 1004k which are coupled to the vertical bottom bus 114a, ... 114(k-1) and 114k of the processors 104a, ... 104(k-1), and 104k. The first set of isolators 1002a, ... 1002(k-2) and 1002(k-1) are coupled to each other in the star connection. The second set of isolators 1004a, ... 1004(k-1) and 1004k are coupled to each other in the cascade connection. As shown in FIG. 10, the central electronic control unit 150 can access all the active balancing controllers 106a, ... 106(k-1), and 106k through the isolators 1002a, ... 1002(k-2) and 1002(k-1) and the vertical bottom bus 116b, ... 116(k-1) and 116k of the active balancing controllers 106b, ... 106(k-1), and 106k. The control system 1000 according to the embodiment of the present invention is also formed as an H-type bus and provides redundancy communication.

Figure 11:
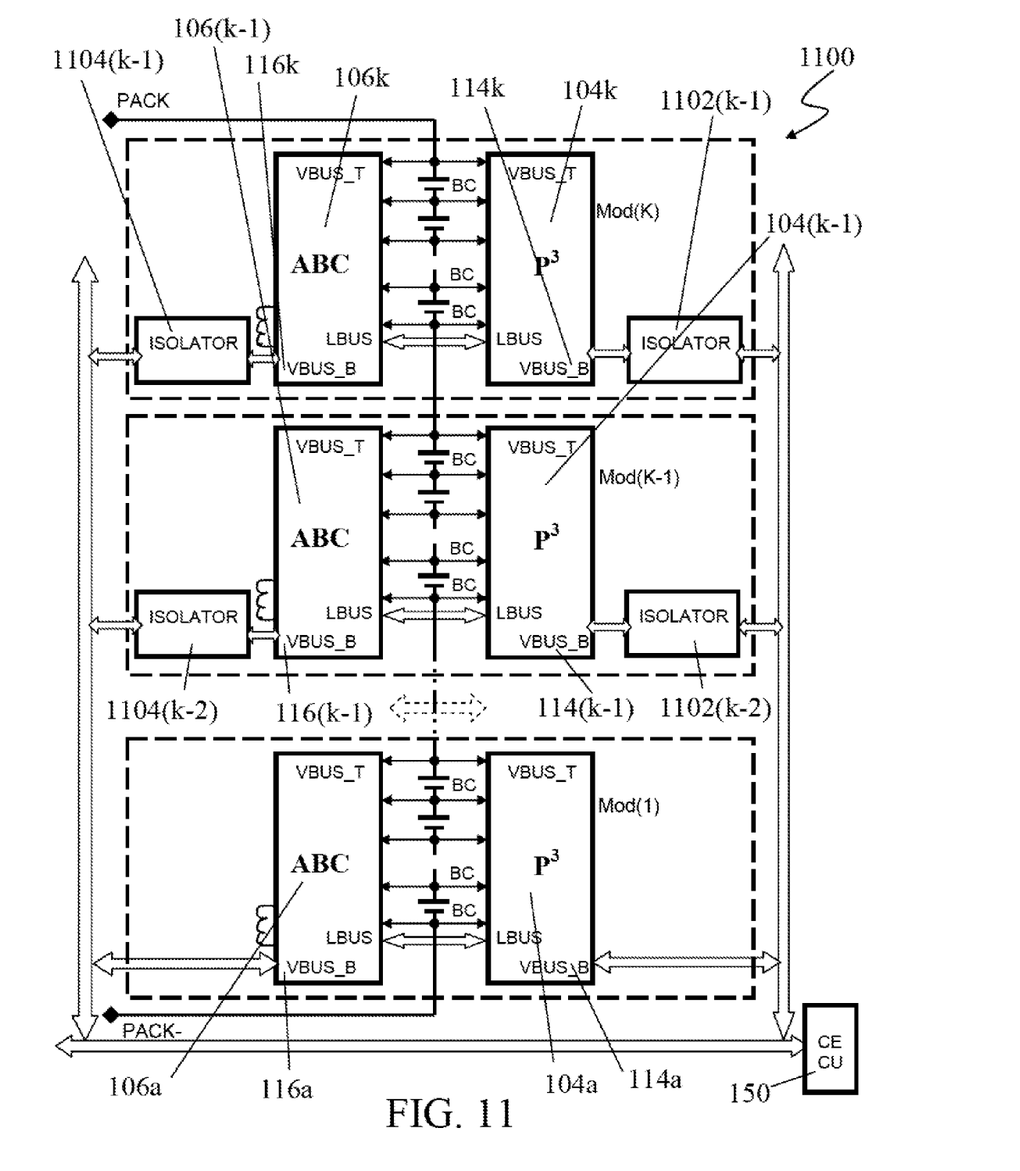
FIG. 11 depicts a control system with isolators in the star connection according to another embodiment of the present invention.

Referring to FIG. 11, it illustrates a control system 1100 according to another embodiment of the present invention. The control system 1100 shown in FIG. 11 is similar to the control system 800 shown in FIG. 8, and similar elements are indicated with same reference numerals. The control system 1100 in the FIG. 11 comprises a first set of a plurality of isolators 1102a, ... 1102(k-2) and 1102(k-1) which are coupled to the vertical bottom bus 114b, ... 114(k-1) and 114k of the processors 104b, ... 104(k-1), and 104k, and a second set of a plurality of isolators 1104a, ... 1104(k-2) and 1104(k-1) which are coupled to the vertical bottom bus 116b, ... 116(k-1) and 116k of the active balancing controllers 106b, ... 106(k-1), and 106k. The first set of isolators 1102a, ... 1102(k-2) and 1102(k-1) are coupled to each other in the star connection and the second set of isolators 1102a, ... 1102(k-2) and 1102(k-1) are coupled to each other in the star connection. The control system 1100 according to the embodiment of the present invention is also formed as an H-type bus and provides redundancy communication.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A control system for a stacked battery of a plurality of battery packs, each battery pack having a plurality of battery cells coupled in series, the control system being capable of reconfiguring communication among the battery packs in the stacked battery, comprising:
a plurality of processors coupled to said battery packs, wherein two adjacent processors of said plurality of processors are able to communicate with each other through a first bus;
a plurality of controllers coupled to said battery packs, wherein two adjacent controllers of said plurality of controllers are able to communicate with each other through a second bus, the plurality of processors being capable of communicating with the plurality of controllers through a third bus;
a first set of plurality of isolators coupled to said plurality of processors, wherein two adjacent processors of said plurality of processors are able to communicate with each other through one of the plurality of isolators; and
a monitoring unit for monitoring communications among the plurality of processors and communications among the plurality of controllers, the monitoring unit being capable of detecting communication problems on the first bus, the monitoring unit further being capable of reconfiguring communication paths among the plurality of processors and communication path among the plurality of controllers,
wherein said first set of plurality of isolators are coupled in a star fashion.

2. The control system of claim 1, further comprising:
a central electronic control unit coupled to a lowest one of said plurality of processors and a lowest one of said plurality of controllers for controlling said plurality of processors and said plurality of controllers.

3. The control system of claim 1, wherein said plurality of processors each have an analog digital converter coupled to said plurality of battery packs for monitoring conditions of said plurality of battery packs.

4. The control system of claim 1, wherein said plurality of controllers are active balancing controllers and wherein each of said active balancing controllers is used for balancing loads of said plurality of battery cells within one of said plurality of battery packs.

5. The control system of the claim 1, further comprising:
a second set of plurality of isolators coupled to said plurality of controllers, and wherein two adjacent controllers of said plurality of controllers are able to communicate with each other through one of said second set of plurality of isolators.

6. The control system of claim 1, wherein said plurality of processors each comprise a plurality of top buses and a plurality of bottom buses, a higher one of said two adjacent processors comprises one bottom bus, a lower one of said two adjacent processors comprises one top bus, and said one bottom bus and said one top bus are coupled to each other to form said first bus.

7. The control system of claim 1, wherein said plurality of controllers each comprise a plurality of top buses and a plurality of bottom buses, a higher one of said two adjacent controllers comprises one bottom bus, a lower one of said two adjacent controllers comprises one top bus, and said one bottom bus and said one top bus are coupled to each other to form said third bus.

8. A control system for a stacked battery of a plurality of battery packs, each battery pack having a plurality of battery cells coupled in series, the control system being capable of reconfiguring communication among the battery packs in the stacked battery, comprising:
a plurality of processors coupled to said battery packs, wherein two adjacent processors of said plurality of processors are able to communicate with each other through a first bus;
a plurality of controllers coupled to said battery packs, wherein two adjacent controllers of said plurality of controllers are able to communicate with each other through a second bus, the plurality of processors being capable of communicating with the plurality of controllers through a third bus;
a first set of plurality of isolators coupled to said plurality of processors, and wherein two adjacent processors of said plurality of processors are able to communicate with each other through one of the plurality of isolators; and
a monitoring unit for monitoring communications among the plurality of processors and communications among the plurality of controllers, the monitoring unit being capable of detecting communication problems on the first bus, the monitoring unit further being capable of reconfiguring communication paths among the plurality of processors and communication path among the plurality of controllers, wherein said first set of plurality of isolators are coupled in a cascade connection.

9. The control system of claim 8, further comprising:
a central electronic control unit coupled to a lowest one of said plurality of processors and a lowest one of said plurality of controllers for controlling said plurality of processors and said plurality of controllers.

10. The control system of claim 8, wherein said plurality of processors each have an analog digital converter coupled to said plurality of battery packs for monitoring conditions of said plurality of battery packs.

11. The control system of claim 8, wherein said plurality of controllers are active balancing controllers and wherein each of said active balancing controllers is used for balancing loads of said plurality of battery cells within one of said plurality of battery packs.

12. The control system of claim 8, further comprising:
a second set of plurality of isolators coupled to said plurality of controllers, and wherein two adjacent controllers of said plurality of controllers are able to communicate with each other through one of said second set of plurality of isolators.

13. The control system of claim 8, wherein said plurality of processors each comprise a plurality of top buses and a plurality of bottom buses, a higher one of said two adjacent processors comprises one bottom bus, a lower one of said two adjacent processors comprises one top bus, and said one bottom bus and said one top bus are coupled to each other to form said first bus.

14. The control system of claim 8, wherein said plurality of controllers each comprise a plurality of top buses and a plurality of bottom buses, a higher one of said two adjacent controllers comprises one bottom bus, a lower one of said two adjacent controllers comprises one top bus, and said one bottom bus and said one top bus are coupled to each other to form said third bus.

15. A method of reconfiguring a communication system having a first plurality of paths capable of communicating a plurality of processors coupled in series, a second plurality of paths capable of communicating a plurality of controllers coupled in series, and a third plurality of paths capable of communicating one of said plurality of processors and one of said plurality of controllers, comprising:
diagnosing said communication system;
confirming one path of said first plurality of paths and said second plurality of paths is not in working condition;
reconfiguring said communication system; and
actuating two third paths of said third plurality of paths, wherein said two third path coupled to two ends of said one path,
wherein diagnosing said communication system further comprising
sending information from a central unit to said plurality of processors through said first plurality of paths,
transmitting said information from a top processor of said plurality of processors to a top controller of said plurality of controllers through one of said third plurality of paths,
transmitting said information from said top controller through said second plurality of paths to said central unit,
comparing said information sent from said central unit with said information received by said central unit, and
indicating a communication problem if said information sent from said central unit is different from said information received by said central unit.

16. The method of claim 15, wherein when said communication problem is indicated, said diagnosing said communication system further comprises:
sending diagnostic information from said central unit to a diagnostic processor of said plurality of processors through said first plurality of paths;
transmitting said diagnostic information from said diagnostic processor of said plurality of processors to a diagnostic controller of said plurality of controllers through one of said third plurality of paths;
transmitting said diagnostic information from said diagnostic processor of said plurality of processors to a diagnostic controller of said plurality of controllers through one of said third plurality of paths;
transmitting said diagnostic information from said diagnostic controller to said central unit through said second plurality of paths;
comparing said diagnostic information sent from said central unit with said diagnostic information received by said central unit; and
determining that said communication system below said diagnostic processor and said diagnostic controller is in working condition when said diagnostic information sent from said central unit is not different from said diagnostic information received by said central unit.

17. The method of claim 16, wherein when said communication problem is indicated, said confirming further comprises:
confirming that said path between said diagnostic processor and a processor which is one level higher than said diagnostic processor or said diagnostic controller and a controller which is one level higher than said diagnostic controller is not in working condition when said diagnostic information sent from said central unit is different from said diagnostic information received by said central unit.

18. The method of claim 17, wherein when said communication problem is indicated, in said actuating, one of said two third paths is a third path which communicates said diagnostic processor and said diagnostic controller.

19. The method of claim 18, wherein when said communication problem is indicated, in said actuating, the other of said two third paths is a third path which communicates said processor which is one level higher than said diagnostic processor and said controller which is one level higher than said diagnostic controller.

* * * * *